US008687062B1

(12) United States Patent
 Reece

(10) Patent No.: US 8,687,062 B1
(45) Date of Patent: Apr. 1, 2014

(54) STEP-STARE OBLIQUE AERIAL CAMERA SYSTEM

(75) Inventor: Kevin Reece, Menlo Park, CA (US)

(73) Assignee: Google Inc., Mountain View, CA (US)

( * ) Notice: Subject to any disclaimer, the term of this patent is extended or adjusted under 35 U.S.C. 154(b) by 379 days.

(21) Appl. No.: 13/222,932

(22) Filed: Aug. 31, 2011

(51) Int. Cl.
 *H04N 7/18* (2006.01)
 *G06K 9/00* (2006.01)
 *A47H 1/10* (2006.01)
 *G03B 17/00* (2006.01)
 *G05D 1/00* (2006.01)

(52) U.S. Cl.
 USPC ........... 348/144; 382/107; 248/323; 396/428; 701/4

(58) Field of Classification Search
 USPC ....... 348/144; 382/107; 248/323; 396/7, 428; 701/4
 See application file for complete search history.

(56) References Cited

U.S. PATENT DOCUMENTS

| | | |
|---|---|---|
| 4,543,603 A | 9/1985 | Laures |
| 5,247,356 A | 9/1993 | Ciampa |
| 5,604,534 A | 2/1997 | Hedges et al. |
| 5,663,825 A | 9/1997 | Amon et al. |
| 5,668,593 A | 9/1997 | Lareau et al. |
| 5,894,323 A | 4/1999 | Kain et al. |
| 6,747,686 B1 | 6/2004 | Bennett |
| 7,424,133 B2 | 9/2008 | Schultz et al. |
| 2003/0185549 A1 * | 10/2003 | Partynski et al. ................. 396/7 |

OTHER PUBLICATIONS

Petrie, G., "Systematic Oblique Aerial Photography Using Multiple Digital Cameras," in *Photogrammetric Engineering & Remote Sensing*, vol. 75, No. 2, pp. 102-107, American Society for Photogrammetry and Remote Sensing (PE&RS) (Feb. 2009).
Lavigne, V., Ricard, B. (2005) Step-Stare Image Gathering for High-Resolution Targeting. In *Advanced Sensory Payloads for UAV* (pp. 71-1-17-14). Meeting Proceedings RTO-MP-SET-092, Paper 17, Neuillary-sur-Seine, France: RTO.

* cited by examiner

*Primary Examiner* — Dave Czekaj
*Assistant Examiner* — Tsion B Owens
(74) *Attorney, Agent, or Firm* — Dority & Manning, P.A.

(57) ABSTRACT

An aerial camera system is disclosed comprising: a camera cluster, including a plurality of cameras, each camera orientated in a direction selected from a plurality of different camera directions having a downward component; one or more rotators that rotate the camera cluster about respective one or more axes in response to one or more signals, and a control module that successively provides one or more signals to the one or more rotators to rotate the camera cluster and cause the cameras in the camera cluster to acquire respective aerial images.

17 Claims, 8 Drawing Sheets

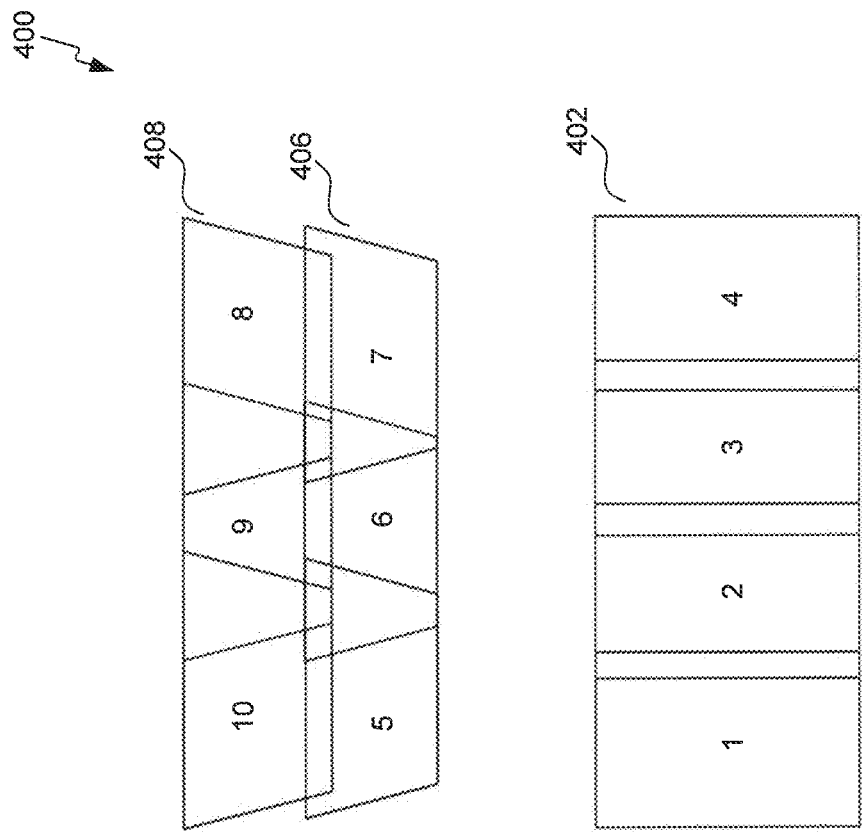
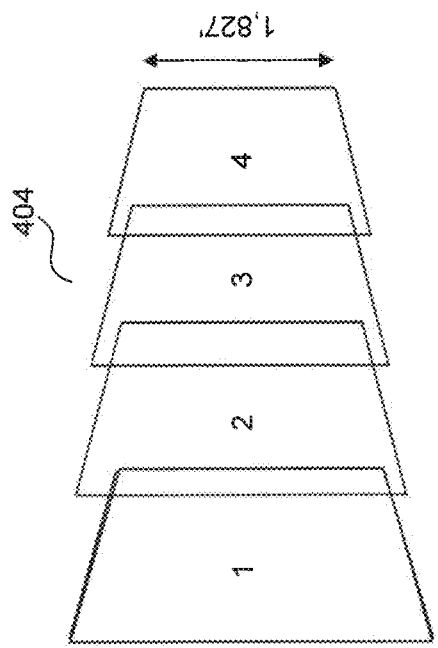
FIG. 4

STEP-STARE OBLIQUE AERIAL CAMERA SYSTEM

BACKGROUND

1. Field

This disclosure relates to systems and methods for acquiring aerial images.

2. Background Art

The field of aerial imagery is concerned with capturing photographs of land masses over large areas, wherein cameras are generally flown by aircraft. In aerial imagery one distinguishes between nadir images and oblique images. Nadir images are photographed using a camera that faces straight down, whereas oblique images are generated using cameras that are oriented at an angle to the ground. Aerial photographs are often combined. For example, an image mosaic can be made by stitching several photographs taken with one or more cameras.

Using traditional commercial systems, there are constraints on the size of photographs that can be taken due to the small size of cameras that can be incorporated in a standard airplane. Due to the limited field of view of traditional systems, an airplane must make many passes over a land mass in order to photograph a large area. There is a need for innovations to counter this problem so that larger areas can be photographed with small cameras, thus reducing the number of flights over a given land mass.

In order to accurately capture land masses and vegetation such as trees, it is also important to be able to photograph images in the near-infrared as well visual parts of the electromagnetic spectrum.

BRIEF SUMMARY

An aerial camera system is disclosed comprising: a camera cluster, including a plurality of cameras, each camera orientated in a direction selected from a plurality of different camera directions having a downward component; one or more rotators that rotate the camera cluster about respective one or more axes in response to one or more signals, and a control module that successively provides one or more signals to the one or more rotators to rotate the camera cluster and cause the cameras in the camera cluster to acquire respective aerial images.

Also disclosed is a method of controlling a camera cluster including a plurality of cameras, wherein each camera is orientated in a direction selected from a plurality of different camera directions having a downward component. The method comprises, for each time of a sequence of times: rotating the camera cluster, and providing one or more signals to cause cameras in the camera cluster to acquire respective aerial images while simultaneously recording data regarding one or more of position, velocity, altitude, or attitude.

Further features and advantages as well as the structure and operation of various embodiments are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings which are incorporated herein and form a part of the specification illustrate the present invention and together with the description further serve to explain the principles of the invention and to enable a person skilled in the pertinent art(s) to make and use the invention.

FIG. 4 illustrates an example of how images can be taken by two cameras in a cluster which is rotated about a horizontal axis followed by rotation about a vertical axis.

Figure 5:
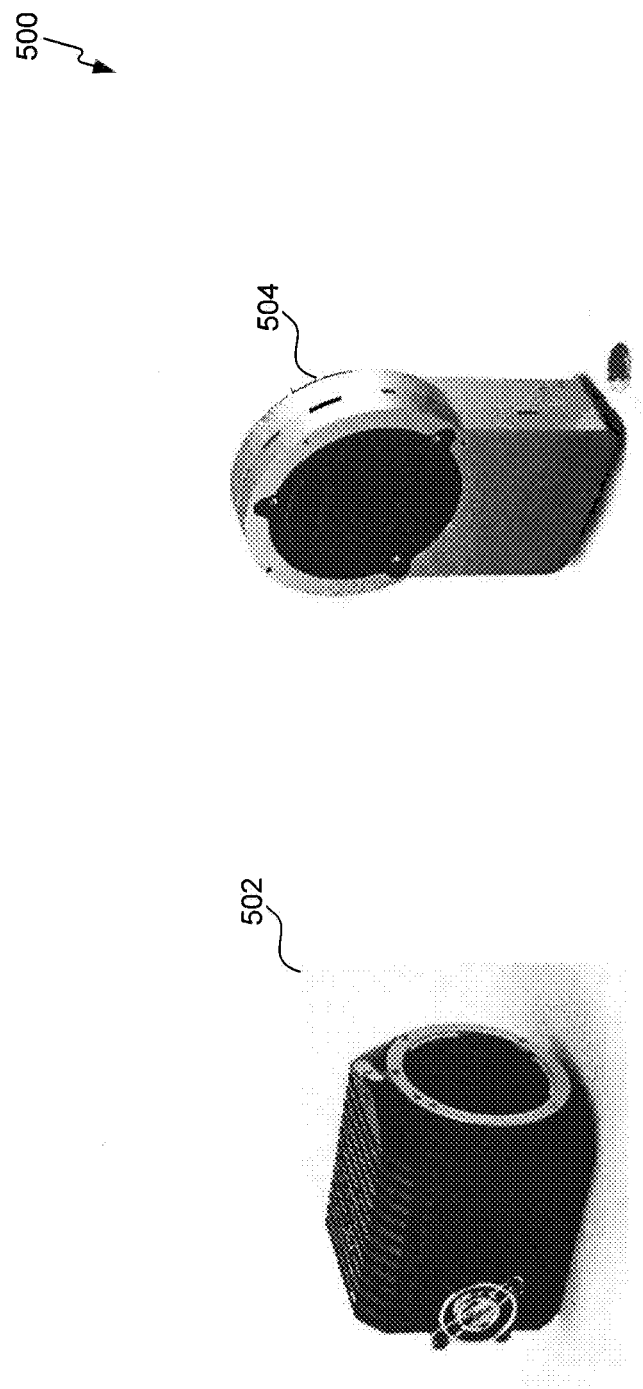

FIGS. 5A-B illustrate commercially available camera systems that can be used in embodiments of the present disclosure.

Figure 6:
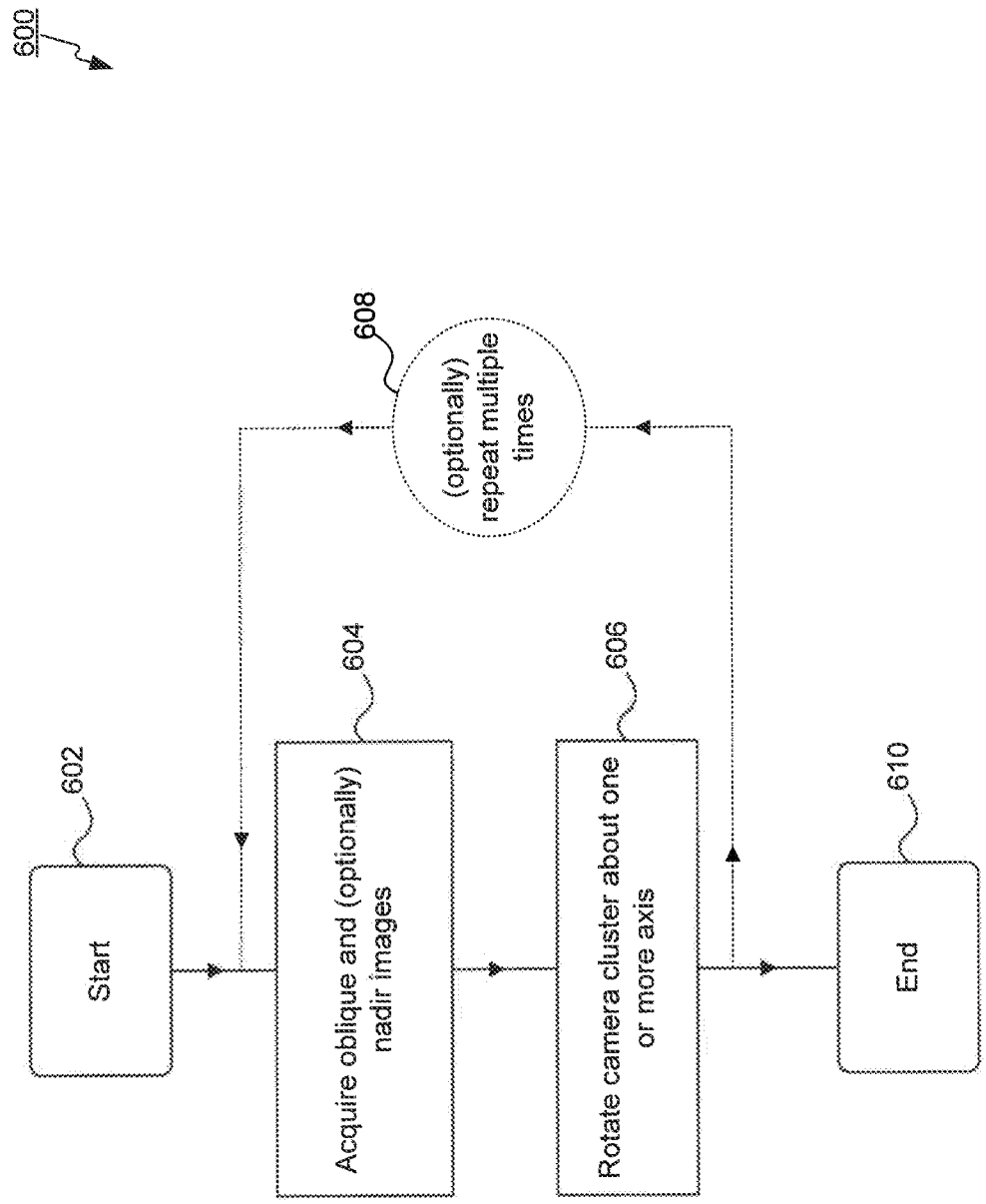

FIG. 6 is flowchart illustrating a method of controlling an embodiment of a camera cluster including a plurality of cameras for acquiring aerial images.

Figure 7:
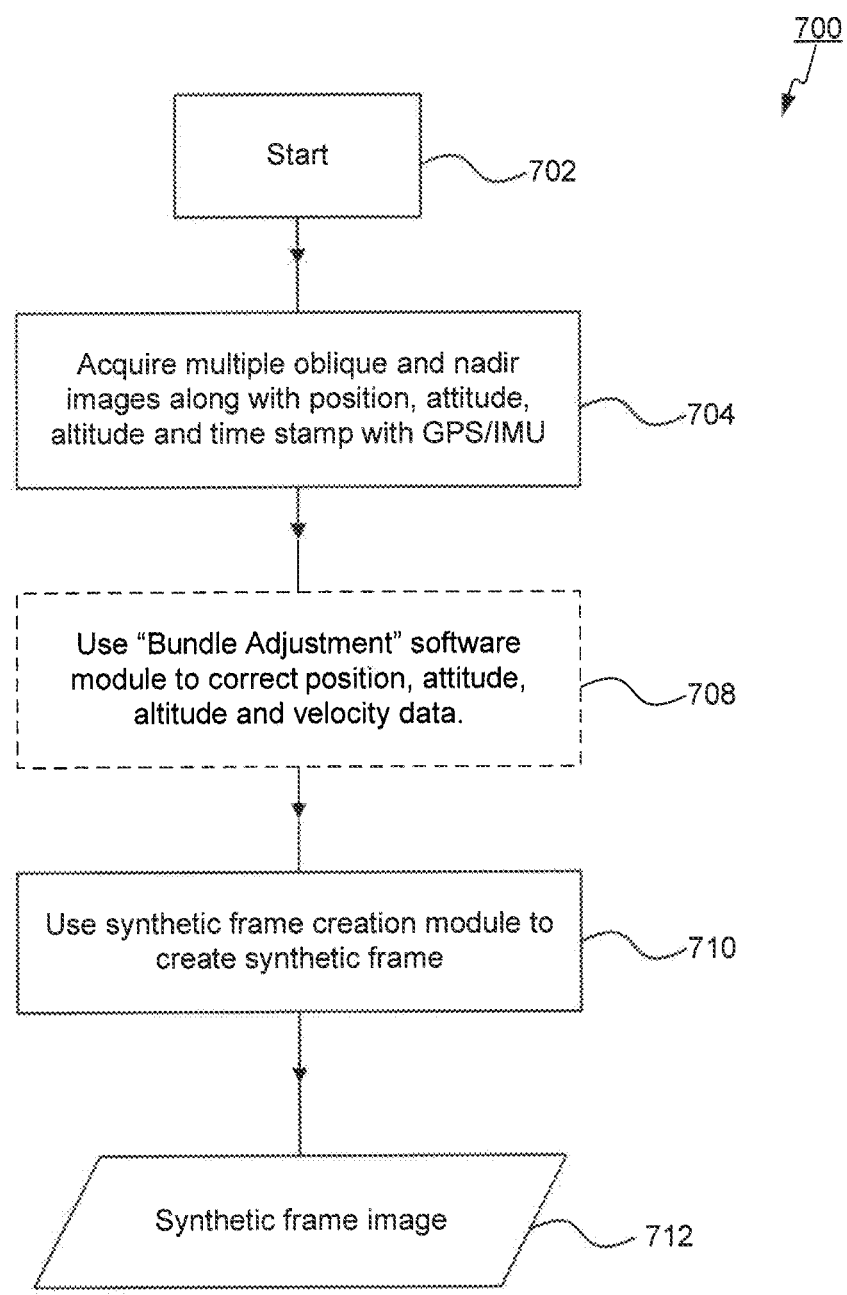

FIG. 7 is a flowchart illustrating a method of acquiring numerous oblique aerial images and creating a synthetic frame image from them.

DETAILED DESCRIPTION OF EMBODIMENTS

This disclosure is directed to a system and method for acquiring aerial images using a step-stare aerial camera system. It is noted that reference in this specification to "one embodiment", "an embodiment", "an example embodiment", etc., indicate that the embodiment described may include a particular feature, structure, or characteristic, but not every embodiment may necessarily include the particular feature, structure, or characteristic. Moreover, such phrases are not necessarily referring to the same embodiment. Further when a particular feature, structure, or characteristic is described in connection with an embodiment, it is submitted that it is within the knowledge of one skilled in the art to effect such feature, structure, or characteristic in connection with other embodiments whether or not explicitly described. Embodiments will be described with reference to the accompanying figures.

Figure 1A:
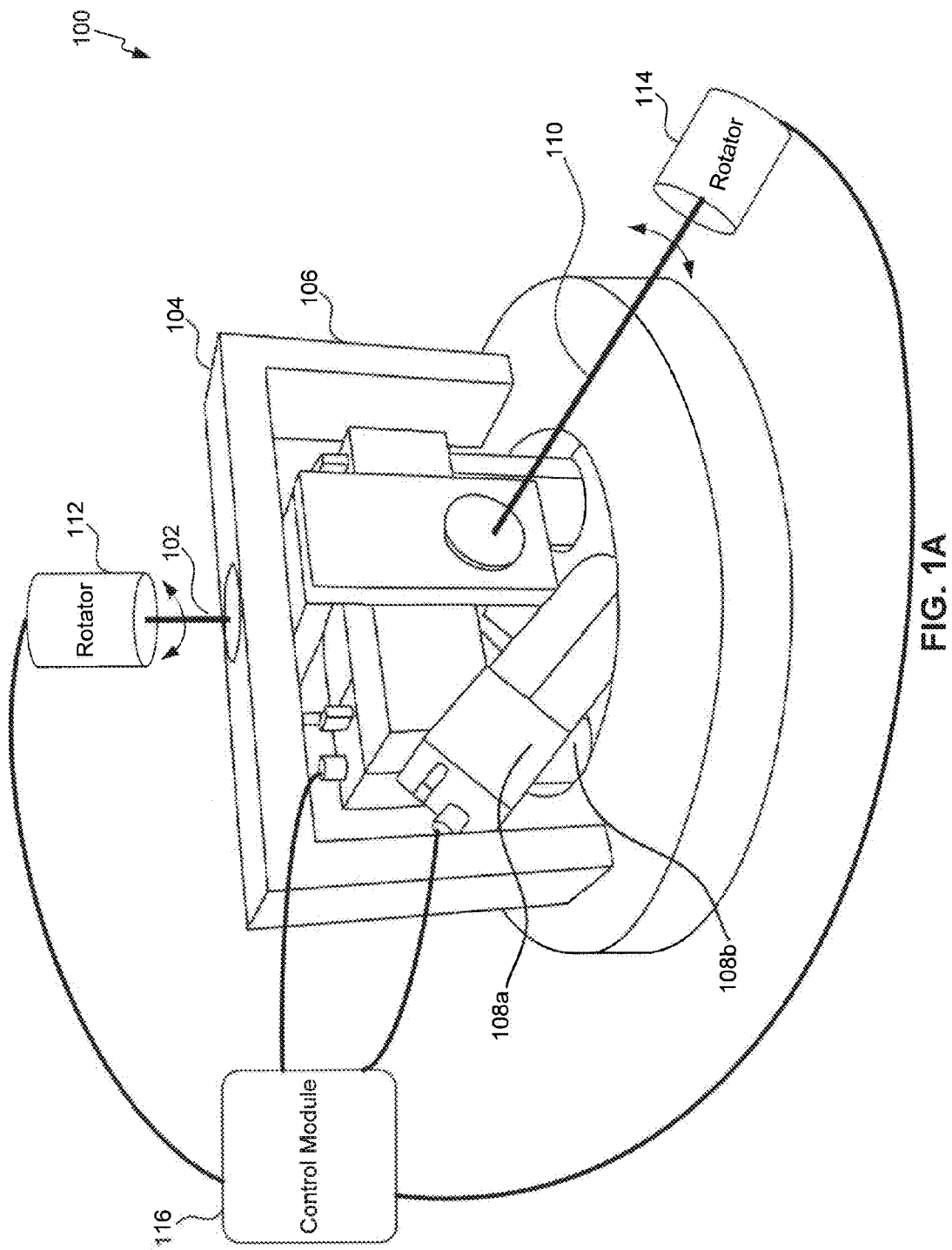
FIG. 1A is a schematic illustration of an embodiment of a step-stare oblique aerial camera system including cameras, control module, and rotators.

FIG. 1A illustrates an embodiment of the step-stare oblique aerial camera system in which the camera system is able to pivot around two axes. A rotator 112 controls rotation about a vertical axis 102. A rotator 114 controls rotation about a horizontal axis 110. A rotator can be a motor or actuator. Also illustrated schematically is one of the cameras that is directed at an oblique angle 108a and a vertically directed camera 108b that is partially obscured by the first camera 108a (in the figure). Also illustrated is a control module 116 that connects to the rotators as well as to the two cameras. This control module controls the rotation of the camera system around the horizontal and vertical axes and also causes the cameras to take vertical and oblique images.

Figure 1B:
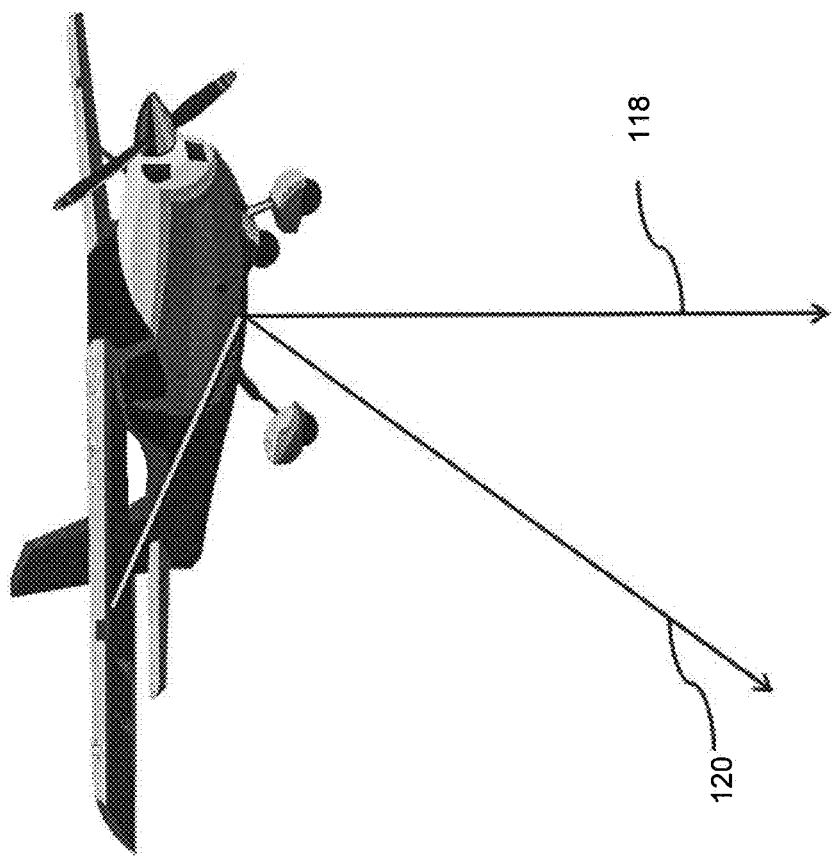
FIG. 1B is a schematic illustration of nadir and oblique directions relative to an aircraft.

FIG. 1B illustrates nadir and oblique directions with respect to an aircraft. A nadir direction 118 is a downward looking direction with respect to an aircraft flying straight and level over the earth's surface. An oblique direction 120 is any direction with a downward component other than the nadir direction 118.

Figure 2:
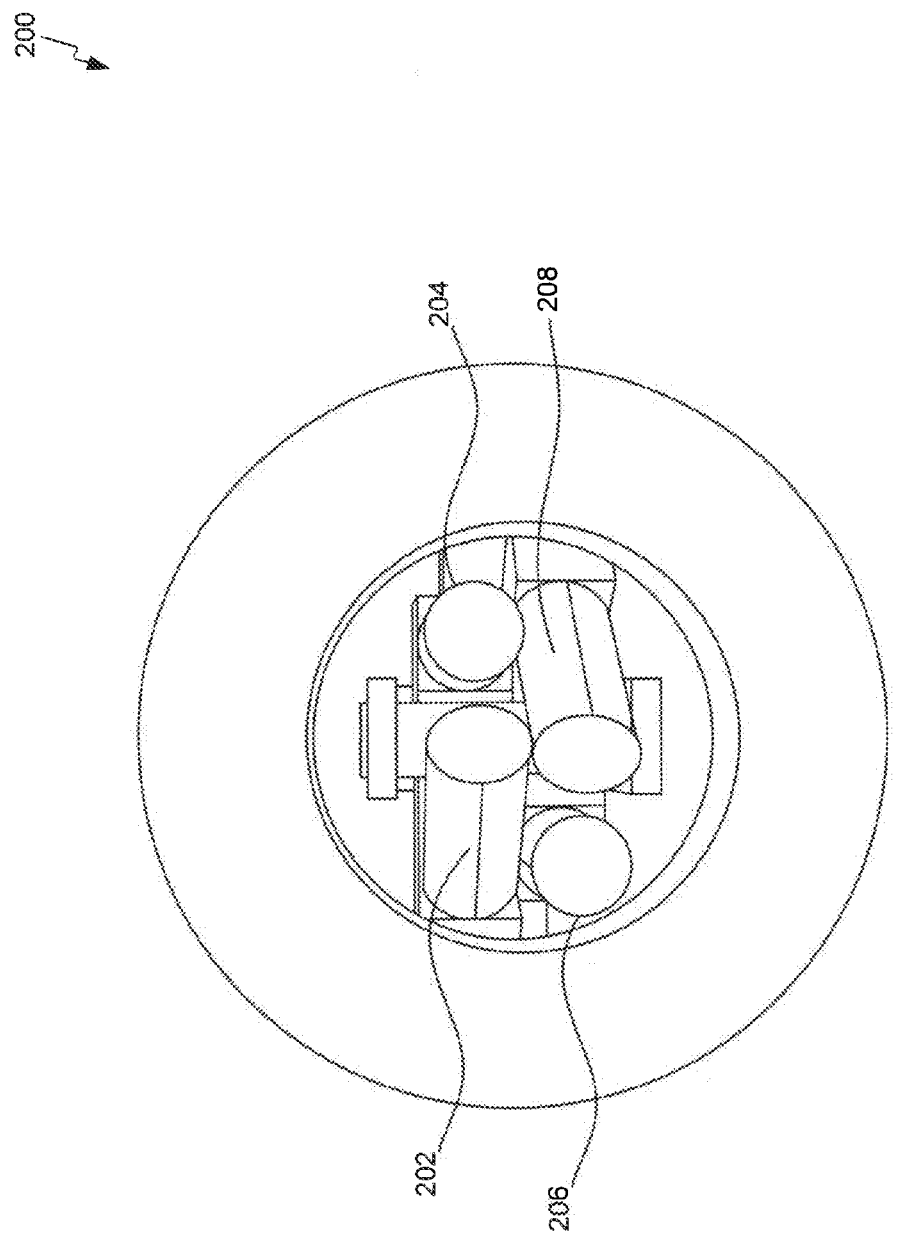
FIG. 2 is a schematic illustration of an embodiment of a step-stare camera system comprising four cameras as seen looking upward from below.

FIG. 2 is a schematic illustration of a step-stare oblique aerial camera system, similar to the one shown in FIG. 1, as one might see it from below looking upward. The embodiment of this illustration has four cameras. Other embodiments may include any number of cameras.

For this embodiment, cameras 202 and 208 illustrate oblique facing cameras. Cameras 204 and 206 illustrate downward facing cameras. In this embodiment, one of the downward facing cameras 206 is configured and arranged to take images in the visual part of the electromagnetic spectrum, while the other downward facing camera takes images in the near-infrared part of the electromagnetic spectrum.

The camera system of FIG. 2 is configured and arranged to take oblique images from the left and right, as well as downward facing images. By using a step-stare action, multiple images in the left, right, and downward facing directions can be taken. The term "step-stare" is to be interpreted as follows. For a given configuration of a camera system, a single image is taken (stare) by each camera. The camera cluster would then be rigidly rotated about a horizontal axis by a fixed angle (step). Then another image would be taken (stare). By continuing this process, a sequence of images can be taken in the right, left, and downward facing directions. The number of steps in the step-stare process can be arbitrary and the rotation angle of a given step may also be arbitrary.

For the embodiment of FIG. 2, after acquiring images along the left, right, and downward facing directions, images can also be obtained in the forward and backward facing directions by rigidly rotating the entire cluster about a vertical axis, and again initiating the step-stare process. The rotation angle about the vertical axis can be 90 degrees so as to generate images in the forward and backward facing directions. In other embodiments, the rotation angle about the vertical axis may be arbitrary.

The terms "step-stare", "step-stare action" etc. should thus be interpreted to mean any arbitrary sequence in which: (1) images are acquired (stare) for a particular orientation of the camera cluster, followed by (2) a rotation about a horizontal or vertical axis (step) and (3) repeating the process an arbitrary number of times, using arbitrary rotations about the horizontal and vertical axes. The notion of how the camera is moved in order to acquire images is further illustrated in the following.

Figure 3:
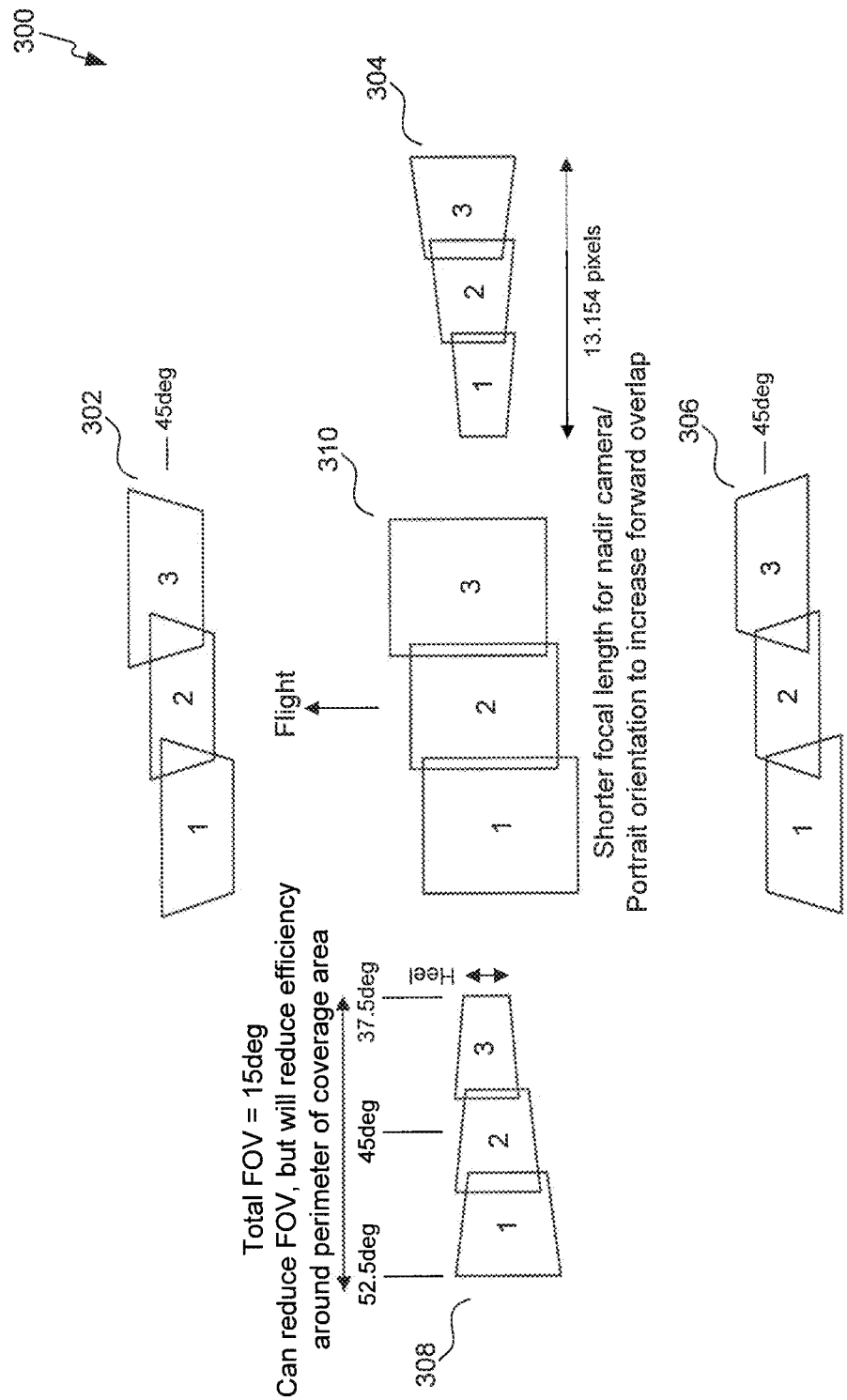
FIG. 3 is a schematic illustration of multiple images taken by an embodiment of a step-stare oblique imaging camera system comprising five cameras pointing: forward, back, left, right and down.

Another embodiment of the camera system can comprise five or more cameras. A five-camera cluster can have two cameras facing in the oblique directions right and left; another two facing front and back; and another one or more facing downward. Such a camera system with five cameras would acquire images as illustrated in FIG. 3. As there are five cameras, five images can be acquired simultaneously. In FIG. 3, each box labeled 1 in 302, 304, 306, 308, and 310 corresponds to an image taken simultaneously in the forward oblique, rightward oblique, backward oblique, leftward oblique, and downward (nadir) directions simultaneously.

The step-stare action corresponds to (1) simultaneously taking an image 1 in each direction 302, 304, 306, 308 and 310, followed by (2) rotating the camera system slightly about the horizontal axis, and simultaneously (3) taking another set of images 2 in each direction 302, 304, 306, 308 and 310, followed by (4) another rotation, taking another image 3 in each direction 302, 304, 306, 308 and 310, etc.

In this embodiment, there are three step-stare actions. As illustrated in FIG. 3, the three different images 1, 2, and 3, in the leftward oblique direction 308 correspond to orientation angles of approximately 50 degrees, 45 degrees, and 40 degrees respectively. Similar orientations are also found for the rightward oblique direction 304 as well as for the forward oblique 302 and backward oblique 306 directions. Also, illustrated in this figure is the direction of the flight of an aircraft (pointing upward in the figure) that can carry the camera cluster.

As illustrated in FIG. 3, the images for 1 are slightly displaced from those for 2, and images for 2 are slightly displaced from those of 3, etc. This is to be expected because, under typical operating conditions, the step-stare aerial camera system will acquire images while it is being transported over the ground by an aircraft. Thus after acquiring images 1, during the time it takes to re-orient the camera cluster to prepare to take images 2, the camera will have moved. Thus the images for 2 are slightly displaced along the aircraft's direction of travel with respect to those for 1. Likewise, images 3 are slightly displaced with respect to those for 2, etc.

FIG. 3 illustrates images acquired during several instants along a flight path of an aircraft that can carry the system over the ground. As the rate at which images are acquired is fairly rapid (e.g. several frames per second with commercial cameras to be discussed below), many such images can be acquired along a typical flight path. In order to acquire images over a large area, such as a city, an aircraft can make many similar flights over the area, with each flight path displaced from previous ones.

After many flights over the ground, a whole collection of images can be acquired. By appropriately coordinating multiple flights over the ground, it is possible for each point on the ground to be photographed from multiple angles. For the embodiment of FIG. 3 the multiple angles would include 3 angles for each of the directions left, right, forward, backward, and downward.

Multiple images of points on the ground can be overlapping as indicated in FIG. 3. The degree of image overlap depends on how quickly images are taken with respect to the speed of the aircraft over the ground.

The camera cluster may be equipped with a positioning device, such as a GPS/IMU system that encodes the position as well as the attitude (roll, pitch, and heading) for each image. Encoders may be provided to record the rotation angles of the rotators. As images are gathered, a large volume of data can be generated and real-time imaging compression can be used to reduce the data rates to manageable levels. For each image, data is taken from the positioning device as well as data from the encoders of rotation angles of the rotators, to compute an estimate of positioning and attitude for each image. Each image is also encoded with a time stamp so that post processing of the data can be carried out to synthesize all the images into a large synthetic frame to create a composite image of a land mass.

The discussion of FIG. 3 relates to an embodiment comprising five cameras facing in the directions: left, right, forward, backward and downward. Such an embodiment requires no rotation about a vertical axis to carry out the step-stare action. For an embodiment with fewer cameras, such as the one illustrated in FIG. 2, it is necessary to carry out rotations about a vertical axis as well as a horizontal axis. There may be an advantage to using a vertical axis in the step stare action, in that by using a vertical axis, a similar number of images can be acquired using fewer cameras.

FIG. 4 illustrates the step-stare action of an embodiment in which rotation about a vertical axis is utilized. An example of such a system is illustrated in FIG. 2. In this example attention is focused on two cameras, one facing leftward and the other facing downward. The corresponding images for the right forward facing oblique camera are not illustrated for simplicity.

FIG. 4 illustrates the sequence of images 404 taken by the left facing oblique camera, as well as the sequence of images 402 taken by the downward facing camera in a step-stare sequence involving rotations about a horizontal axis. Thus, a series of images 1, 2, 3, and 4 is captured, as illustrated in sequences 402 and 404. After a rotation of the entire camera system about a vertical axis, another step-stare sequence can be carried out utilizing rotations about the horizontal axis. The images taken by the oblique-oriented camera (previously facing left and now facing forward) are schematically illustrated as 5, 6, 7, 8, 9, 10 in sequences 406 and 408 respectively. Thus, the camera that initially took the images illustrated in sequence 404, after rotating about a vertical axis, is also the same camera that acquires images in sequences 406 and 408.

FIGS. 5A-5B illustrate two possible cameras that can be used in the disclosed system. These are commercial off-the-shelf cameras that are small and lightweight and are convenient for use in this application. FIG. 5A illustrates a 16 megapixel interline camera (Kodak KA1-16000). This camera takes three frames per second and has a 4,872×3,248 pixel resolution. This camera is an interline CCD image sensor that provides real time imaging for capture of still images or motion capture. It is a high-resolution camera with an electronic shutter. Another example camera is shown in FIG. 5B. This is a 50 megapixel full frame camera (Kodak KAF-50100), with a long life shutter. This camera takes 1.1 frames per second and has a 8,304×6220 pixel resolution. Another advantage of using these cameras is that they are small enough to fit into the camera holes commonly found in aircraft modified for aerial surveys.

FIG. 6 is a flowchart that illustrates the method of acquiring images using the step-stare oblique aerial camera system as described with reference to FIGS. 1-5. In the first step 604 oblique and (optionally) nadir images are acquired. In certain embodiments nadir images in the infrared are also acquired. Thus step 604 corresponds to the images labeled 1 in FIG. 4. In the next step 606 the camera cluster is rotated about one or more axes such as a horizontal axis corresponding to the situation in FIG. 4. After this rotation has been made the process is repeated 608 and another set of images is acquired. These would be the images labeled 2 in FIG. 4, for example. The process of repeating 608 the action of steps 604 and 606 gives rise to, for example, the acquisition of images 3, and 4 in FIG. 4. In the next step 606 the camera cluster is rotated about a vertical axis (an possibly also about a horizontal axis) so as to reposition the camera system to prepare to acquire images 5, 6, 7, 8, 9 and 10 of FIG. 4. In this embodiment, nadir images are not acquired during step 604 that acquires images 5, 6, 7, 8, 9 and 10. The simpler situation illustrated in FIG. 3 can also be seen to be a particular instance of the process of FIG. 6 in which the camera cluster is rotated 606 only about a horizontal axis.

Under typical operating conditions, the entire process of FIG. 6 is repeated multiple times, as indicated by step 612, as a system is flown over a land mass.

The ability to rotate the camera cluster around the vertical axis 102 as illustrated in FIG. 1, also has the benefit of providing the ability to correct for the phenomenon called "crab". Crab can be understood as follows. When an airplane flies it must always be facing into the wind, so if there is a crosswind the airplane is actually oriented in a direction that is slightly different from the direction of travel. Thus, when the airplane is not facing along the direction of travel it is important to correct the orientation of the camera systems so that it is aligned with the actual direction of travel. This correction is called "correction for crab" or "crab correction".

Thus, suppose an aircraft carrying an embodiment camera cluster is pointed in a direction 10 degrees to the right or to the left of its direction of travel. In this case the orientation of the camera cluster needs to be changed by the same amount (10 degrees), so as to face the camera cluster not along the direction the aircraft is pointed in, but rather, along the direction of travel.

FIGS. 1-4 relate to example camera clusters comprising either 4 or 5 cameras that acquire images through the step-stare process. Camera clusters that use two rotators: one about horizontal axis 114, and one about vertical axis 112 are illustrated in FIG. 1. Further embodiments are also possible, including an example step-stare camera system that operates so as to be able to be rotated about three axes. This can be accomplished using a system that provides for three axes of rotation and control using conventional technology (e.g. using gimbals). Such embodiments can be easily adapted by those of skill in the art based on known technology.

The control module 116 illustrated schematically in FIG. 1 controls all the actions of the step-stare aerial camera system. It controls the position of the cameras via the horizontal rotation axis and provides control signals to acquire images in a step-stare fashion. It also controls the vertical axis rotation to acquire forward and backward images after left and right images are acquired. It also provides control signals for the correction for crab. This correction is enabled using flight data that gives the orientation of the airplane with respect to its direction of travel. The control module also governs the capture of images and the storage of them in a database. It also acquires position and attitude data along with a timestamp associated with each image. This data is also stored. The data for positioning and orientation is typically acquired by a GPS/IMU system. The control module also controls the capture and storage of infrared images taken by the downward facing near-infrared nadir camera.

One of the challenges involved with acquiring oblique imagery is that some land areas require a steeper oblique angle than others (such as city cores with tall buildings and or narrow streets). Since most oblique systems support a single fixed oblique angle, the user must select a single oblique angle that works in the most situations possible. This is a compromise, so the chosen angle may not be optimal for a particular area. In additional embodiments, the ability to adjust the oblique angle of the oblique cameras either manually (one time prior to each flight) or electrically in flight using a rotator is provided. Using electrical adjustment, the oblique angle of the cameras can be further optimized for the specific areas being acquired.

After a large collection of images is taken all the images must eventually be assembled into a synthetic frame using software. Key information required for this assembly of the images into a synthetic frame is associated with data pertaining to position and attitude. Each image is associated with this sort of data. In order to improve the accuracy of data pertaining to position, velocity, attitude and altitude, embodiments of the invention also provide for software to carry out a so called "bundle adjustment." The bundle adjustment algorithm is used to improve the accuracy of this data.

Embodiments of the invention also comprise a software module configured to create a synthetic frame image from a collection of images and associated data corresponding to one or more of position, velocity, attitude and altitude. In order to create a complete database of images of a city, multiple flights may be required. As an aircraft flies over a city or land mass in parallel lines, images are taken as illustrated in FIG. 3 or 4.

The net result is each area of the ground is photographed from multiple points of view. Images from different flights must be associated with one another.

For example, in one flight line, images labeled 1 facing downward (310 in FIG. 3) are not of the same land mass as images labeled 1 in the other directions (302, 304, 306, and 308). However, as the aircraft makes another pass over the ground on a different flight path, the image labeled 1 in 308 of FIG. 3 of the first flight, might correspond to the image labeled 1 in 310 of FIG. 3 from a different flight over the ground. Thus, there is a complex database of images that must be correlated with one another. In other words, the image of a given land area pointing left in one flight must be associated with the image of the same piece of land from the front, back, left and right and down from other flights. This is a complex situation that must be sorted out by the software. The synthetic frame image creation module is configured to sort out this complicated association between images. In so doing, it creates what is called a "synthetic frame" that is a composite image of the land mass where different views can be seen.

FIG. 7 illustrates the method of acquiring numerous oblique aerial images and creating a synthetic frame image from them. In the first step 704, many images are acquired of a land mass using the method described above with reference to FIG. 6. Each image acquired in step 704 is also encoded with position, attitude, and altitude data, along with a timestamp using a GPS/IMU system. In the next step 708 the "bundle adjustment" software module is optionally used to improve the accuracy of the position and attitude estimates. If a sufficiently accurate positioning system is used or if the accuracy requirements for a particular application are low, bundle adjustment may not be necessary. In the final step 710 a synthetic frame creation module is used to create the synthetic frame image 712.

A further embodiment of the disclosed system, configured to allow for rotation about three axes, allows for motion correction to reduce image blur resulting from the motion of the plane over the ground. As mentioned earlier, a three axis system allows for motion of the camera cluster to be made around three separate mutually orthogonal axes. Using such a system, it is possible to introduce a slight nodding motion to reduce image blur. The use of a system with three axes of rotation enables a camera cluster to expand beyond the four view directions that have been disclosed previously. Using a system with three axes of rotation it is possible to have 5, 6, 7, etc., more view directions.

The embodiments described so far have discussed the near infrared camera in the nadir position. However, it is easy to generalize the camera cluster system to put near infrared cameras in different directions such as right and left, forward and back oblique directions.

In the embodiments described above, cameras are disclosed that take pictures in the visible as well as the near infrared parts of the electromagnetic spectrum. However, further embodiments can comprise spectral filters to capture various arbitrary other parts of the electromagnetic spectrum as well as the infrared and visible.

CONCLUSION

The Summary and Abstract sections may set forth one or more but not all exemplary embodiments of the present invention as contemplated by the inventors and are thus not intended to limit the present invention and the appended claims in any way.

Various embodiments have been described above with the aid of functional building blocks illustrating the implementation of specific features and relationships thereof. The boundaries of these functional building blocks have been arbitrarily defined herein for the convenience of the description. Alternate boundaries can be defined so long as specific functions in relationships thereof are appropriately performed.

The foregoing description of these specific embodiments will so fully reveal the general nature of the invention that others can apply knowledge within the skill of the art readily modify and/or adapt for various applications such as specific embodiments without undue experimentation without departing from the general concept of the present invention. Therefore such adaptations and modifications are intended to be within the meaning and range of equivalence of the disclosed embodiments based on the teachings and guidance presented herein. It is to be understood that the phraseology or terminology herein is for the purpose of description and not of limitation. Such that the terminology and phraseology of the present specification is to be interpreted by the skill artist in light of the teachings and guidance.

The breadth and scope of the present invention should not be limited to any of the above described exemplary embodiments.

What is claimed is:

1. An aerial camera system comprising: a camera cluster including a plurality of cameras, wherein each camera is oriented in a direction selected from a plurality of different camera directions having a downward component; three rotators, each rotator configured to rotate the camera cluster about a respective axis of rotation in response to one or more signals, wherein a first rotator of the three rotators is configured to change an orientation of the camera cluster about a vertical axis and a second rotator of the three rotators is configured to change the orientation of the camera cluster about a horizontal axis; and a control module configured to (a) provide one or more signals to cause the first rotator of the three rotators to rotate the camera cluster about the vertical axis; (b) to successively: (i) provide a signal to the second rotator of the three rotators to rotate the camera cluster thereby changing the orientation of the camera cluster about the horizontal axis, and (ii) cause cameras in the camera cluster to acquire respective aerial images; (c) repeat steps (a) and (b).

2. The system of claim 1, wherein the camera cluster comprises one or more cameras configured to capture oblique views.

3. The system of claim 2, wherein the control module is configured to adjust the oblique angle of the one or more cameras configured to capture oblique views.

4. The system of claim 2, wherein the camera cluster comprises two cameras configured to capture oblique views and at least one camera configured to capture a downward looking nadir view.

5. The system of claim 4, wherein the camera cluster further comprises a camera configured to capture data in the near-infrared portion of the electro-magnetic spectrum of a downward looking nadir view.

6. The system of claim 1, wherein the control module is configured to cause one of the rotators to rotate the camera cluster about a vertical axis to correct for situations in which an aircraft carrying the camera system may be pointed in a direction differing from its direction of travel due to the presence of cross winds.

7. The system of claim 1, wherein the control module provides motion correction to reduce image blur resulting from motion of the plane over the ground.

8. The system of claim 1, further comprising a GPS/imu module configured to encode data, associated with captured images, pertaining to one or more of position, velocity, and attitude.

9. The system of claim 8, further comprising a bundle adjustment software module configured to improve the accuracy of the data pertaining to one or more of position, velocity and attitude associated with a given image.

10. The system of claim 9, further comprising a synthetic frame image creation software module configured to create a synthetic frame image from a collection of images and associated data corresponding to one or more of position, velocity and attitude.

11. A method of controlling a camera cluster including a plurality of cameras, wherein each camera is oriented in a direction selected from a plurality of different camera directions having a downward component, comprising:
  (a) providing one or more signals to cause a first rotator to rotate the camera cluster about a vertical axis;
  (b) successively for each time of a sequence times: (i) providing a signal to a second rotator to rotate the camera cluster changing an orientation of the camera cluster about a horizontal axis, and (ii) causing cameras in the camera cluster to acquire respective aerial images; and
  (c) repeating steps (a) and (b).

12. The method of claim 11, further comprising:
  (a) using the camera cluster to acquire one or more oblique aerial images of an area; and,
  (b) using the camera cluster to acquire one or more images of a downward looking nadir view of the area.

13. The method of claim 12, further comprising using the camera cluster to capture data in the near-infrared portion of the electro-magnetic spectrum of a downward looking nadir view.

14. The method of claim 11, further comprising rotating the camera cluster about a vertical axis to correct for situations in which an aircraft carrying the camera cluster may be pointed in a direction differing from its direction of travel due to the presence of cross winds.

15. The method of claim 11, further comprising using a GPS/imu module to encode data, associated with captured images, pertaining to one or more of position, velocity, and attitude.

16. The method of claim 15, further comprising using a "Bundle Adjustment" software module to improve the accuracy of the data pertaining to one or more of position, velocity and attitude associated with a given image.

17. The method of claim 16, further comprising using a synthetic frame image creation software module to create a synthetic frame image from a collection of images and associated data corresponding to one or more of position, velocity and attitude.

* * * * *